July 28, 1964 M. H. LEWIN ETAL 3,142,823

PUNCHABLE MEMORY CARD HAVING PRINTED CIRCUIT THEREON

Filed April 13, 1962 3 Sheets-Sheet 1

INVENTORS
MORTON H. LEWIN &
JAN A. RAJCHMAN

BY

Earl V. Olson

ATTORNEY

July 28, 1964 M. H. LEWIN ETAL 3,142,823

PUNCHABLE MEMORY CARD HAVING PRINTED CIRCUIT THEREON

Filed April 13, 1962 3 Sheets-Sheet 2

INVENTORS
MORTON H. LEWIN &
BY JAN A. RAJCHMAN
Carl V. Olson
ATTORNEY

PUNCHABLE MEMORY CARD HAVING PRINTED CIRCUIT THEREON

Filed April 13, 1962 3 Sheets-Sheet 3

INVENTORS
MORTON H. LEWIN &
JAN A. RAJCHMAN
BY
Carl V. Olson
ATTORNEY

United States Patent Office 3,142,823

Patented July 28, 1964

3,142,823
PUNCHABLE MEMORY CARD HAVING PRINTED CIRCUIT THEREON

Morton H. Lewin and Jan A. Rajchman, Princeton, N.J., assignors to Radio Corporation of America, a corporation of Delaware Filed Apr. 13, 1962, Ser. No. 187,390
4 Claims. (Cl. 340—173)

This invention relates to memories such as are used for the storage of information in digital form, and particularly to fixed, content addressable memories. While not limited to any particular digital code, the invention is particularly useful as applied to the 4–9 alpha-numeric digital code commonly employed in connection with punched cards.

A fixed memory is one in which information is stored in a permanent manner, as by means of punched holes in a card or by means of selectively wired diodes in a matrix of conductors. A content addressable memory (known also as an associative or a catalog memory) is one from which a certain desired word can be retrieved without knowing the location of the word. At least a part (tag bits or characters) of the desired word or words must be known. The entire memory is addressed with the known part of the word. This results in retrieval of the remainder (data bits or characters) of the selected word or words. Fixed, content addressable memories can be very useful in the electronic processing of lists of information. For example, each line of an insurance company's list of policy numbers and corresponding policyholders' names and premium due dates may be stored as one word in a fixed memory. The entire memory can be addressed with the part of the word representing a given premium due date for the purpose of retrieving all of the corresponding policy numbers and policyholders' names.

It is an object of this invention to provide an improved memory construction in which information is stored by selectively connecting conductors of printed circuits.

It is another object to provide an improved electrical memory in which the permanent entering of information can be conveniently accomplished on a printed circuit support in the manner commonly used in entering information on punched paper cards.

It is yet another object to provide a fixed electrical memory which is adjustable in that the stored information can be added to, subtracted from and sorted in the manner commonly employed with a stack of punched paper cards.

It is a further object to provide a fixed memory from which the stored information can be selectively retrieved or read out by means operative to sense the presence or absence, of punched holes, or, alternatively, by means operative to electrically sense the punch-altered printed electrical circuits.

It is still another object to provide a fixed memory from which the stored information can be selectively retrieved or read out in an electrical content-addressing fashion.

In one aspect of the invention, an insulating support or card is provided with a plurality of printed conductors each connected at one end through a printed diode to a common bus. The bus is connected through a printed resistor to a bias through connector in the card. A number of signal through connectors and associated connected conductive islands are located on the card along each of said conductors near or at prospective punched hole locations. The card, the conductors and the conductive islands are constructed so that each conductor can be connected to one of the through connectors with which it is associated by punching a hole through the card.

In the example of the invention which will be described in detail, each conductor may be thus connected to one of nine signal through conductors. An additional group of four conductors is arranged with relation to additional diodes, signal through connectors and conductive islands so that each conductor is connected to one of the four associated signal through connectors unless reconnected to one of the remaining three signal through connectors by the punching of a hole. The circuitry may be arranged so that the prospective hole locations correspond with the prospective hole locations according to the 4–9 code in the commonly used business machine punched cards.

The above-described cards are constructed so that when a plurality of them are arranged in a stack, each through connector in each card electrically contacts the corresponding through connector of adjacent cards. This provides a stack connection through the stack of cards for every one of the superimposed prospective hole locations. A bias stack connection is also made through the stack of cards by the bias through connectors in the individual cards. The information in the stack of cards can be retrieved or read out in electrical content addressing fashion by electrical means connected to the stack connections going through the stack of cards.

These and other objects and aspects of the invention will be apparent to those skilled in the art from the following more detailed description taken in conjunction with the appended drawing, wherein.

Figure 1:
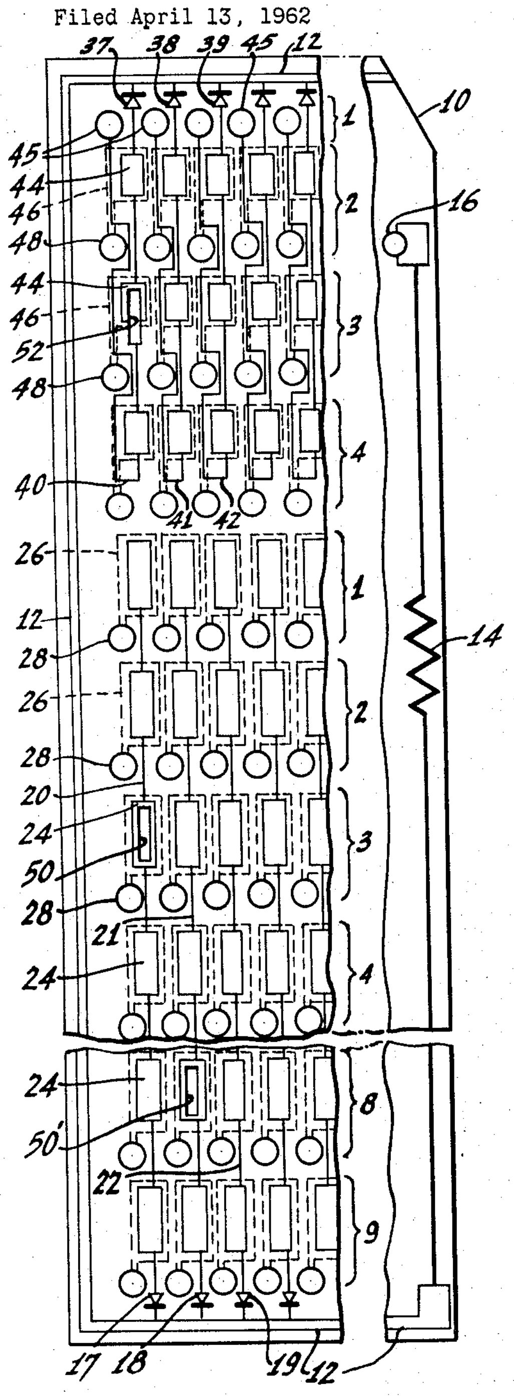
FIGURE 1 is a fragmentary view illustrating an insulating support or card having printed circuitry thereon which is adapted for the storage of information according to the 4–9 code by selectively punching holes at prospective hole locations.
Figure 6:
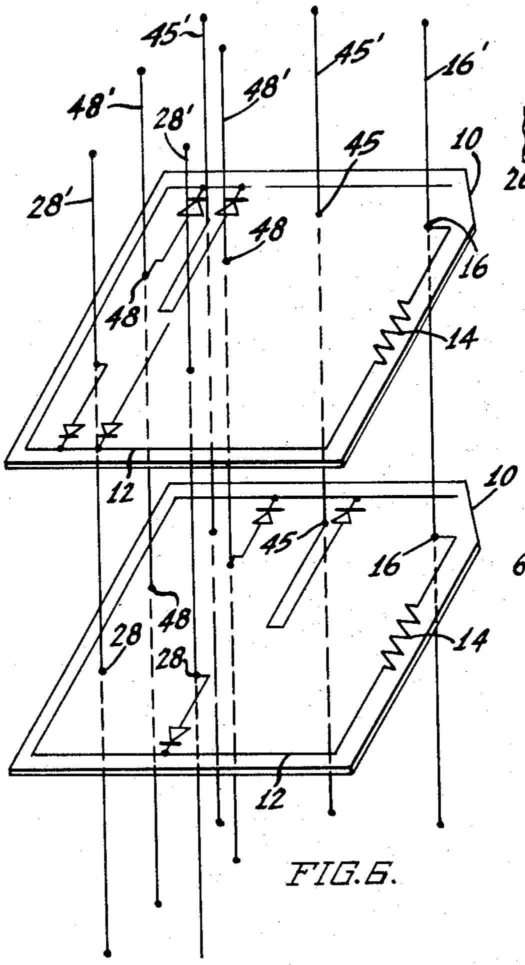
Figure 4:
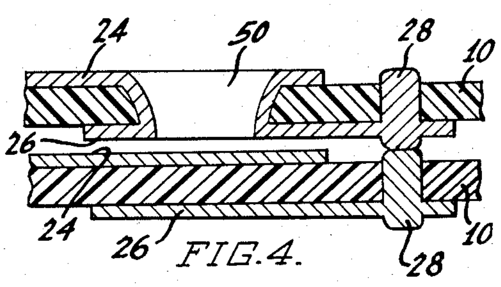
Figure 5:
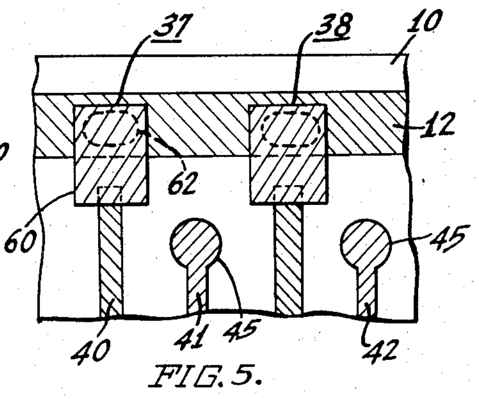
Figure 7:
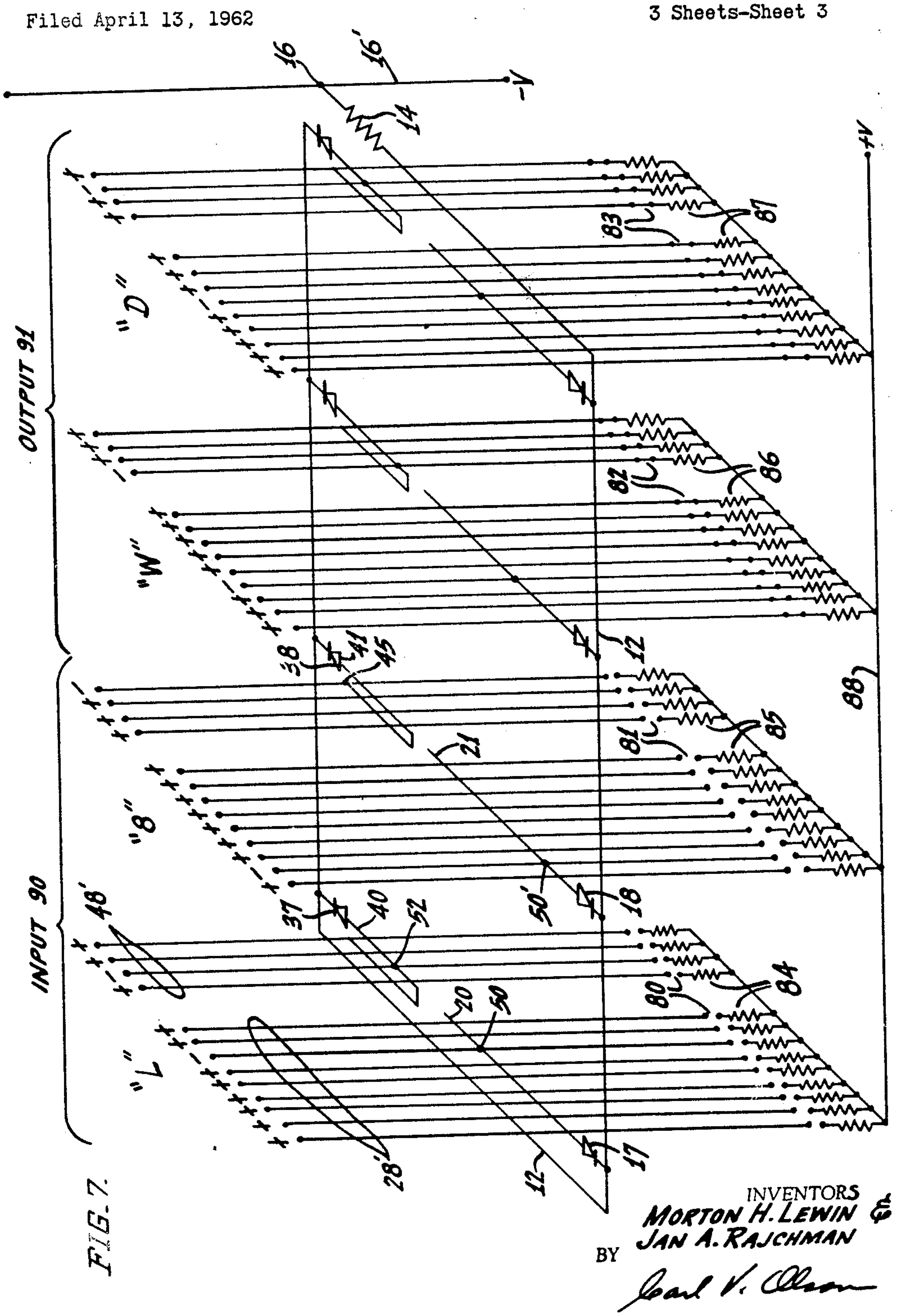

FIGURE 4 is a fragmentary cross-sectional view illustrating the manner in which the punching of a hole in the printed circuit card of FIGURE 1 simultaneously causes a desired connection between a conductor on one side of the card and a conductive island on the other side of the card, and illustrating the construction of through connectors in the card of FIGURE 1 whereby the stacking of a plurality of cards results in a stack connection going through all of the cards of the stack;

FIGURE 5 is an enlarged fragmentary view illustrating the physical construction of the printed diodes represented schematically in FIGURE 1 by diode symbols;

FIGURE 6 is a perspective view illustrating the electrical circuitry of two of many printed circuit cards like the card of FIGURE 1 that may be arranged in a stack; and FIGURE 7 is a perspective view of the electrical circuitry of one printed circuit card having one hypothetical word "L8WD" stored therein, and electrical means for content addressing tag bits "L8" for the purpose of reading out the data bits "WD" of the word.

Referring now in greater detail to FIGURE 1, there is shown an insulating support or card 10 which may have the general dimensions of the commonly used punched card, or any other desired dimensions. A common bias bus printed conductor 12 extends around three peripheral edges of the card 10 and has one end thereof connected through a resistor 14 to a bias through connector 16. A first plurality of printed diodes 17, 18, 19 (shown at the bottom of the card) each have one terminal connected to the bias bus 12 and have another terminal connected to a respective conductor 20, 21, 22.

The printed diodes 17, 18, 19 will be described in greater detail in connection with FIGURE 5. Each of the conductors 20, 21, 22 includes a number of enlarged conductive portions 24 located at prospective punched hole locations. In the present example to be described wherein the 4–9 alpha-numeric code is employed, there may be nine enlarged portions 24 and nine corresponding prospective hole locations along each of the conductors 20, 21, 22. Conductive islands 26 are printed on the opposite side of the card 10 at each of the prospective hole locations. Each of the conductive islands 26 is electrically connected to a corresponding signal through connector 28.

A second plurality of printed diodes 37, 38 39 each have one terminal connected to the common bias bus 12 and have another terminal connected to respective ones of a second plurality of printed conductors 40, 41, 42. Each of the conductors 40, 41, 42 includes three enlarged conductive portions 44 located at prospective punched hole locations. Each of the conductors 40, 41, 42 extends from its respective diode 37, 38, 39, through its enlarged portions 44, and returns to a respective one of terminal through connectors 45. Conductive islands 46 are printed on the opposite side of the card 10 at each of the prospective hole locations associated with the second plurality of conductors 40, 41, 42. Each of the conductive islands 46 is connected to a corresponding signal through connector 48.

The enlarged portions 44 and the conductive islands 46 associated with the second plurality of conductors 40, 41, 42 are smaller than the enlarged portions 24 and conductive islands 26 associated with the first plurality of conductors 20, 21, 22. The arrangement is such that (as will be described in connection with FIGURE 4) the punching of a hole at a prospective hole location 50 in the enlarged portion 24 of a conductor 20 in the first group of conductors causes the electrical connection of the conductor 20 to the through connector 28 associated with that prospective hole location. However, the punching of a hole 52 at a hole location of the conductor 40 in the second group causes both a connection of the conductor 40 to the corresponding signal through connector 48, and also simultaneously causes the severance of the conductor 40 so that it is no longer connected at its other terminal end to the corresponding terminal through connector 45.

Figure 2:
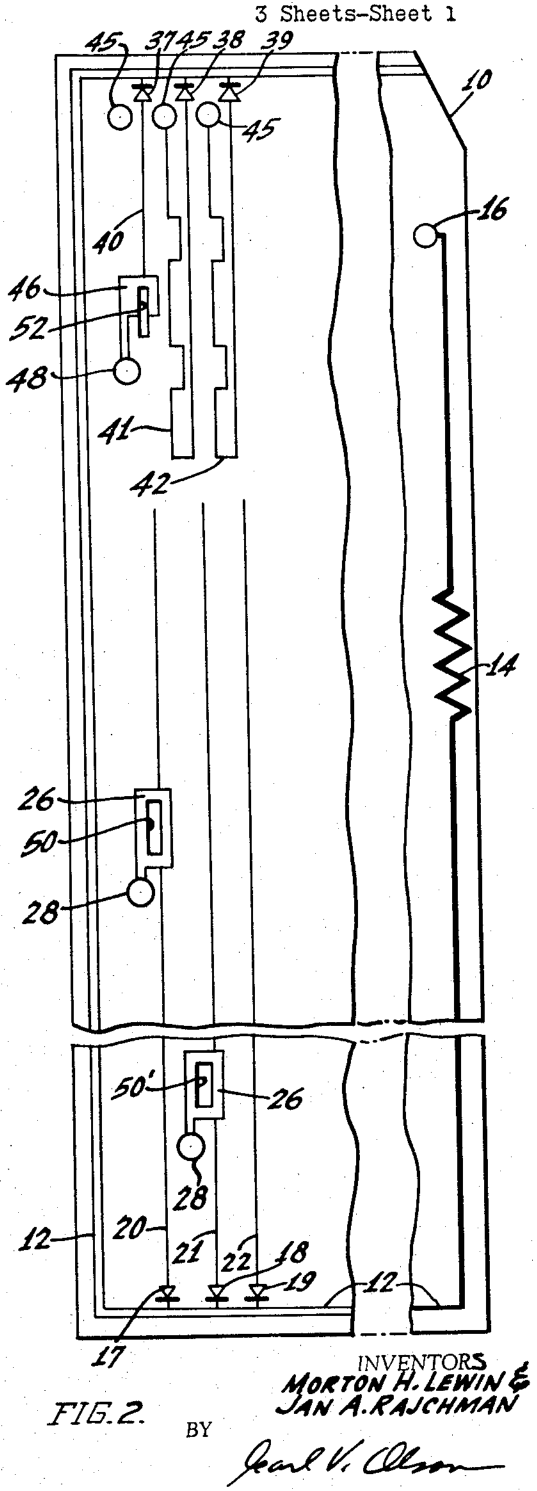
FIGURE 2 is a similar fragmentary view illustrating the effective electrical circuit of the printed card of FIGURE 1 as determined by three illustrative punched holes.

FIGURE 2 is a simplified representation of the electrical circuit on the card of FIGURE 1 which results from the punching of the holes 50, 50′ and 52. It is seen that the resulting electrical circuit is one wherein the anode of diode 17 is connected through conductor 20 and conductive island 26 to the signal through connector 28 associated with the punched hole 50. The anode of diode 18 is connected through the conductor 21 and conductive island 26 to the signal through connector 28 associated with the punched hole 50′. The anode of diode 37 in the second group is connected through the conductor 40 and the conductive island 46 to the signal through connector 48 associated with the punched hole 52. The anodes of diodes 38 and 39 remain connected through respective conductors 41 and 42 to the respective terminal through connectors 45.

Figure 3:
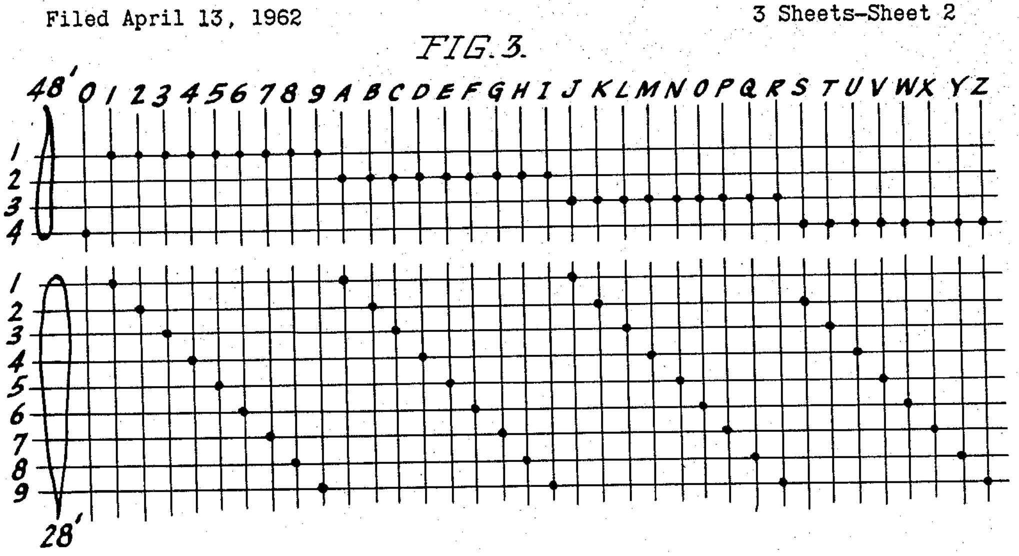
FIGURE 3 is a chart illustrating the known 4–9 alphanumeric code with which the printed card of FIGURE 1 is, for example, adapted to be used.

FIGURE 3 shows the alpha-numeric 4–9 code for which, by way of example, the memory card 10 of FIGURES 1 and 2 is adapted to be used. The group 28′ of row conductors in FIGURE 3 labeled 1 through 9 correspond respectively with the correspondingly designated lower first groups or clusters of enlarged conductive portions 24, conductive islands 26 and through connectors 28 in FIGURE 1. The group 48′ of row conductors in FIGURE 3 labeled 1 through 4 correspond with the similarly labeled upper second group or clusters of enlarged conductive portions 44, conductive islands 46 and through connectors 48 in FIGURE 1. The vertical lines in FIGURE 3 bear designations indicating the alpha-numeric characters corresponding with the punched hole connections (shown by dots) of the two groups 28′ and 48′ of row conductors. In FIGURE 1, the punched hole connection 50 of conductor 20 and the punched hole connection 52 of conductor 40 correspond with the storage of the alphabetic character "L" as can be seen with reference to the code chart of FIGURE 3. The punched hole connection 50′ of conductor 21 and the connection of conductor 41 to the terminal through connector 45 represent the storage of the numeric character "8" as can be seen with reference to the code chart of FIGURE 3.

FIGURE 4 is an enlarged fragmentary sectional view illustrating two superposed cards 10 showing the enlarged portions 24 of conductors, conductive islands 26 and through connectors 28. The top one of the cards illustrated has been punched to provide a punched hole 50 which extends through the card 10. The construction of the card 10, the enlarged conductive portion 24, the conductive island 26 punching apparatus is such that the punching of the hole 50 causes a flow of the conductive material along the walls of the hole 50 so that the enlarged conductive portion 24 is electrically connected to the conductive island 26. Since the conductive island 26 is initially connected to the through connector 28, the punching of the hole 50 causes the enlarged portion 24 and its associated conductor to be electrically connected to the through connector 28.

The lower one of the two cards 10 shown in FIGURE 4 is not provided with a punched hole, with the result that the conductive enlarged portion 24 remains electrically insulated from the corresponding through connector 28. While the enlarged portions 24 and the conductive island 26 are shown in FIGURES 1 and 4 to be printed on opposite sides of the card 10, both the enlarged portions 24 and the conductive islands 26 may alternatively be printed on the same side of the card and separated by an electrically insulating layer. An electrically insulating layer may be made thinner than the card. The punch-formed electrical connection is more easily perfected with a thin insulation layer between enlarged portions 24 and islands 26.

It is possible to store information by making electrical connections between the conductors and the associated through connectors without punching holes through the card 10. In this event, the resulting memory has all the advantages given herein except that it cannot be sensed by means responsive solely to the presence or absence of punched holes.

FIGURE 4 also illustrates an exemplary construction of the through connections 28 which includes protrusions above and below the surfaces of the card 10 for the purpose of insuring electrical connections exclusively through corresponding through connectors of a large number of cards arranged in a stack.

FIGURE 5 is an enlarged fragmentary view illustrating the construction of the printed diodes represented by diode symbols 37 and 38 in FIGURE 1. Each printed diode includes a printed terminal 60 connected to a corresponding conductor such as 40, and includes a material 62 between the terminal 60 and the common bias bus 12. The material 62 is a non-linear impedance or rectifying material which cooperates with the common bus 12 and the terminal 60 to constitute a non-linear impedance unidirectionally conductive device or diode. The material 62 may be an organic material such as certain phthalocyanines in the form of small crystallites, pressed powders or thin films. The rectifying characteristics of the device may depend on the thickness of the organic material, the material used for the terminals and the area of contact between the organic material and the terminals. The diodes, as well as all the printed conductor elements may be formed on the insulating card 10 by brushing, spraying, painting, stenciling, evaporation, or any other suitable printing technique.

FIGURE 6 illustrates the electrical circuitry resulting when a plurality of cards 10 are stacked one upon the other. The vertical lines represent the stack connections or conductors formed by the contacting through connectors of the cards (only two of which are shown) in the stack. All the bias through conductors 16 form a conductive path represented by the vertical line 16'. The terminal through connectors 45 form the conductive paths designated 45'. The signal through connectors 28 and 48 form the conductive paths 28' and 48' respectively.

FIGURE 7 illustrates the electrical circuit of a single simplified printed card having punched hole connections for the storage of a hypothetical four-character word "L8WD." FIGURE 7 also shows the vertical conductors or conductive paths, like those of FIGURE 6, constituted by all the through connectors in a stack of cards not otherwise included in the illustration. Additionally, there is shown electrical means for retrieving or reading out the stored information in content addressing fashion. The electrical means, external of the stack of printed cards, includes switches 80, 81, 82 and 83 for determining which of the bits of the words in the stack shall be considered "tag characters," and which shall be considered "data characters." The switches 80 and 81 are in the open position indicating that the first and second bits of the word are to be considered tag characters, and the switches 82 and 83 are in the closed position indicating that the third and fourth characters of the word are to be considered data characters. The switches 80 through 83 selectively connect the vertical stack conductors through individual resistors 84 through 87 to an external bias bus 88 having a +V terminal to which is applied a positive voltage bias from a source (not shown). The stack bias conductor 16' is connected to an external bias source (not shown) having a −V terminal.

The connections of the diodes in FIGURE 7 are such as to store the four-character word "L8WD." The input tag character signal applied to the input 90 corresponds with the tag character "L8" and is constituted by the input potentials shown by the plus and minus signs applied to the tops of the vertical lines (stack conductors) at the input 90. The negatively energized ones of the input vertical stack conductors of input 90 are all connected through diodes to the common bus 12, which is in turn returned through the common bias resistor 14 to the −V terminal. Since the current paths are negatively energized at both ends, no current flows and the bus 12 assumes a negative potential. This indicates that the input tag character signal corresponds with the tag characters of the word stored in the card shown. (If the input tag characters did not correspond with the stored tag characters, the common bus 12 would have assumed a positive potential indicating that the stored word was not the one desired, and none of the vertical stack connectors of output 91 would be negatively energized.)

The negative potential on the common bus 12 causes the flow of current from the +V terminal along the bus 88 and through those ones of the resistors 86 and 87 which are connected by diodes to the negative common bus 12. This flow of current in the recited paths causes voltage drops in the connected ones of the resistors 86 and 87, so that the corresponding ones of the output stack connections of output 91 assume relatively negative potentials. The others of the output connections remain at the positive potential of the +V source. The output potentials at output 91 indicate that the data characters of the stored word are "WD." It is seen that the interrogation of the tag characters at input 90 with potentials corresponding to the tag characters "L8" results in the retrieval at output 91 of the potentials corresponding with the data characters "WD" of the stored word. By manipulation of the switches 84 through 87, any ones of the characters of the words in the stack may be used as tag characters, the remaining characters then being information or data characters.

What is claimed is:

1. A punchable card comprising an insulating card wherein information can be stored in accordance with the presence or absence of punched holes at prospective hole locations, a common bus printed along an edge on one side of said card, a bias through connector in said card, a printed resistor connected between said bias through connector and said bus, a plurality of conductors printed on said one side of the card each going through and around a plurality of prospective hole locations, a plurality of printed diodes on said card each having one terminal connected to a respective one of said conductors and having another terminal connected to said bus, a plurality of signal through connectors in said card each near one of said prospective hole locations, and a plurality of conductive islands each printed on the opposite side of said card at and around a prospective hole location and each being connected to a corresponding signal through connector, said card, conductors and islands being constructed so that the punching of a hole at a hole location can cause an electrical connection from the conductor passing therethrough and therearound to a respective conductive island on the other side of the card, whereby information stored in said card can be read out by means responsive to the presence and absence of punched holes, and the information in a stack of said cards can be read out electrically in content addressing fashion by means connected to said signal through connectors.

2. A punchable card comprising an insulating card wherein information can be stored in accordance with the presence or absence of punched holes at prospective hole locations, a common bus printed along an edge on one side of said card, a bias through connector in said card, a printed resistor connected between said bias through connector and said bus, a plurality of conductors printed on said first side of the card and each going through a plurality of prospective hole locations, a plurality of printed diodes each having one terminal connected to one end of a respective one of said conductors and having another terminal connected to said bus, a plurality of terminal through connectors in said card each connected to the other end of one of said conductors, a plurality of signal through connectors in said card each near one of said prospective hole locations, and a plurality of conductive islands each printed on the opposite side of the card at a prospective hole location, each of said islands being connected to a corresponding signal through connector, said card and conductors being constructed so that the punching of a hole at a hole location can disconnect the corresponding conductor from its corresponding terminal through connector and connect the conductor to the respective island on the other side of the card, whereby information stored in said card can be read out by means responsive to the presence and absence of punched holes, and the information in a stack of said cards can be read out electrically in content addressing fashion by means connected to said signal through connectors.

3. A memory comprising an insulating card wherein information can be stored in accordance with the presence or absence of punched holes at prospective hole locations in first and second groups of prospective hole locations, a first plurality of conductors on said card each going through a plurality of prospective hole locations in said first group of hole locations, a first plurality of diodes on said card each having one terminal connected to a respective one of said conductors, a first plurality of signal through connectors in said card each near one of said prospective hole locations in said first group of hole locations, a first plurality of conductive islands each at a prospective hole location in said first group of hole locations, each of said islands being connected to a corresponding signal through connector, said card, conductors and islands being constructed so that the punching of a hole at a hole location in said first group can cause an electrical connection from the conductor passing therethrough and therearound to the respective conductive island, a second plurality of conductors on the card and each going through a plurality of prospective hole locations of said second group of hole locations, a second plurality of diodes each having one terminal connected to one end of a respective one of said second plurality of conductors, a plurality of terminal through connectors in said card each connected to the other end of one of said second plurality of conductors, a second plurality of signal through connectors in said card each near one of said prospective hole locations in said second group of hole locations, and a second plurality of conductive islands each at a prospective hole location in said second group of hole locations, each of said islands being connected to a corresponding signal through connector, said card, conductors and islands being constructed so that the punching of a hole at a hole location in said second group can disconnect the corresponding conductor from its corresponding terminal through connector and connect the conductor to the respective island.

4. A punchable card comprising an insulating card wherein information can be stored in accordance with the presence or absence of punched holes at prospective hole locations in first and second groups of prospective hole locations, a common bus printed along at least two edges on one side of said card, a bias through connector in said card, a printed resistor connected between said bias through connector and said bus, a first plurality of conductors printed on said one side of the card each going through and around a plurality of prospective hole locations in said first group of hole locations, a first plurality of printed diodes on said card each having one terminal connected to a respective one of said conductors and having another terminal connected to said bus, a first plurality of signal through connectors in said card each near one of said prospective hole locations in said first group of hole locations, a first plurality of conductive islands each printed on the opposite side of said card at and around a prospective hole location in said first group of hole locations, each of said islands being connected to a corresponding signal through connector, said card, conductors and islands being constructed so that the punching of a hole at a hole location in said first group can cause an electrical connection from the conductor passing therethrough and therearound to the respective conductive island on the other side of the card, a second plurality of conductors printed on said first side of the card and each going through a plurality of prospective hole locations of said second group of hole locations, a second plurality of printed diodes each having one terminal connected to one end of a respective one of said second plurality of conductors and having another terminal connected to said bus, a plurality of terminal through connectors in said card each connected to the other end of one of said second plurality of conductors, a second plurality of signal through connectors in said card each near one of said prospective hole locations in said second group of hole locations, and a second plurality of conductive islands each printed on the opposite side of the card at a prospective hole location in said second group of hole locations, each of said islands being connected to a corresponding signal through connector, said card, conductors and islands being constructed so that the punching of a hole at a hole location in said second group can disconnect the corresponding conductor from its corresponding terminal through connector and connect the conductor to the respective island on the other side of the card, whereby information stored in said card can be read out by means responsive to the presence and absence of punched holes, and the information in a stack of said cards can be read out electrically in content addressing fashion by means connected to said signal through connectors.

References Cited in the file of this patent

UNITED STATES PATENTS

| | | |
|---|---|---|
| 2,872,664 | Minot | Feb. 3, 1959 |
| 2,920,311 | Kalfaian | Jan. 5, 1960 |
| 2,933,717 | Tyas | Apr. 19, 1960 |
| 3,052,749 | Snapp | Sept. 4, 1962 |
| 3,072,734 | Fox | Jan. 8, 1963 |